United States Patent
Wang et al.

[11] Patent Number: 6,100,519
[45] Date of Patent: Aug. 8, 2000

[54] PHOTO-DETECTOR BASED CALCULATING MEANS HAVING A GRATING WHEEL WITH INTEGRATED LENSES

[75] Inventors: Ching Shun Wang, 2F, No. 550, Min Tsu E. Rd., Taipei; Cheng-Liang Hsieh, 7F, No. 142-1, Lane 108, Sec. 1, Kuang Fu Rd., E. Dist., Hsin Chu; Shu Fang Lu, 4F, No. 19, Shin Chien St., Peitou, Taipei, all of Taiwan

[73] Assignees: Ching Shun Wang, Taipei; Cheng-Liang Hsieh, Hsin Chu; Shu Fang Lu, Taipei; Yu Shian Liu, Taipei; Ming Hsiang Chu, Taichung Hsien; Mi-Jing Wang, Taipei Hsien; Nelson Lai, Taipei; You-Yan Yang, Taipei Hsien, all of Taiwan

[21] Appl. No.: 09/088,767

[22] Filed: Jun. 2, 1998

[51] Int. Cl.[7] .................................................. G01D 5/347
[52] U.S. Cl. ................................ 250/231.13; 250/231.14; 250/231.16
[58] Field of Search ........................ 250/231.13, 231.16, 250/237 G, 231.14

[56] References Cited

U.S. PATENT DOCUMENTS

| | | | |
|---|---|---|---|
| 3,598,493 | 8/1971 | Fisher | 250/231.16 |
| 3,770,970 | 11/1973 | Trump | 250/231.16 |
| 4,820,918 | 4/1989 | Igaki et al. | 250/231.13 |
| 5,126,560 | 6/1992 | Kraus | 250/231.13 |

*Primary Examiner*—John R Lee
*Attorney, Agent, or Firm*—Rosenberg, Klein & Lee

[57] ABSTRACT

A photo-detector based calculating means having a grating wheel with integrated lenses is provided. The photo-detector based calculating means having a grating wheel with integrated lenses includes a light source (1), a grating wheel (2), and a photo-detector (3), with the light emitted from the light source (1) impinging upon an input plane of the grating wheel (2). The photo-detector (3) has a set of photo-sensitive chips (31) to receive the working light beams emitted from the grating wheel (2). The input plane of the grating wheel (2) has a ring-shaped lens (24) to focus the light emitted from the light source (1). The output plane (23) of the grating wheel (2) has a plurality of tooth-shaped lenses (25), each projecting perpendicularly to the ring-shaped lens (24), which can focus the working beams after the working beams pass through the output plane (23), thus minimizing interference.

11 Claims, 16 Drawing Sheets

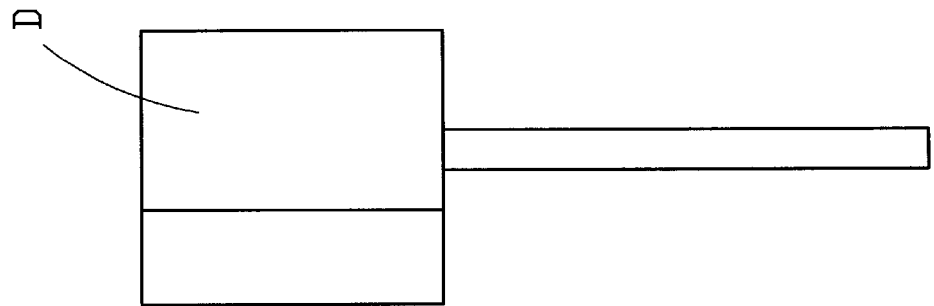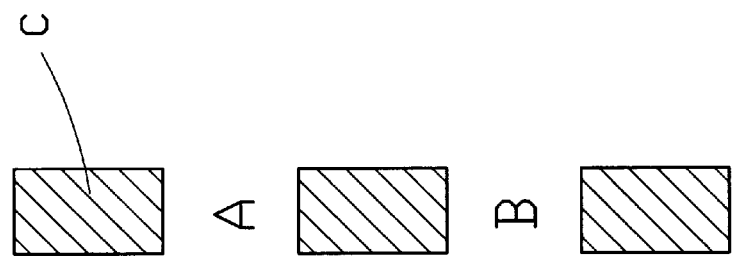
FIG. 3A

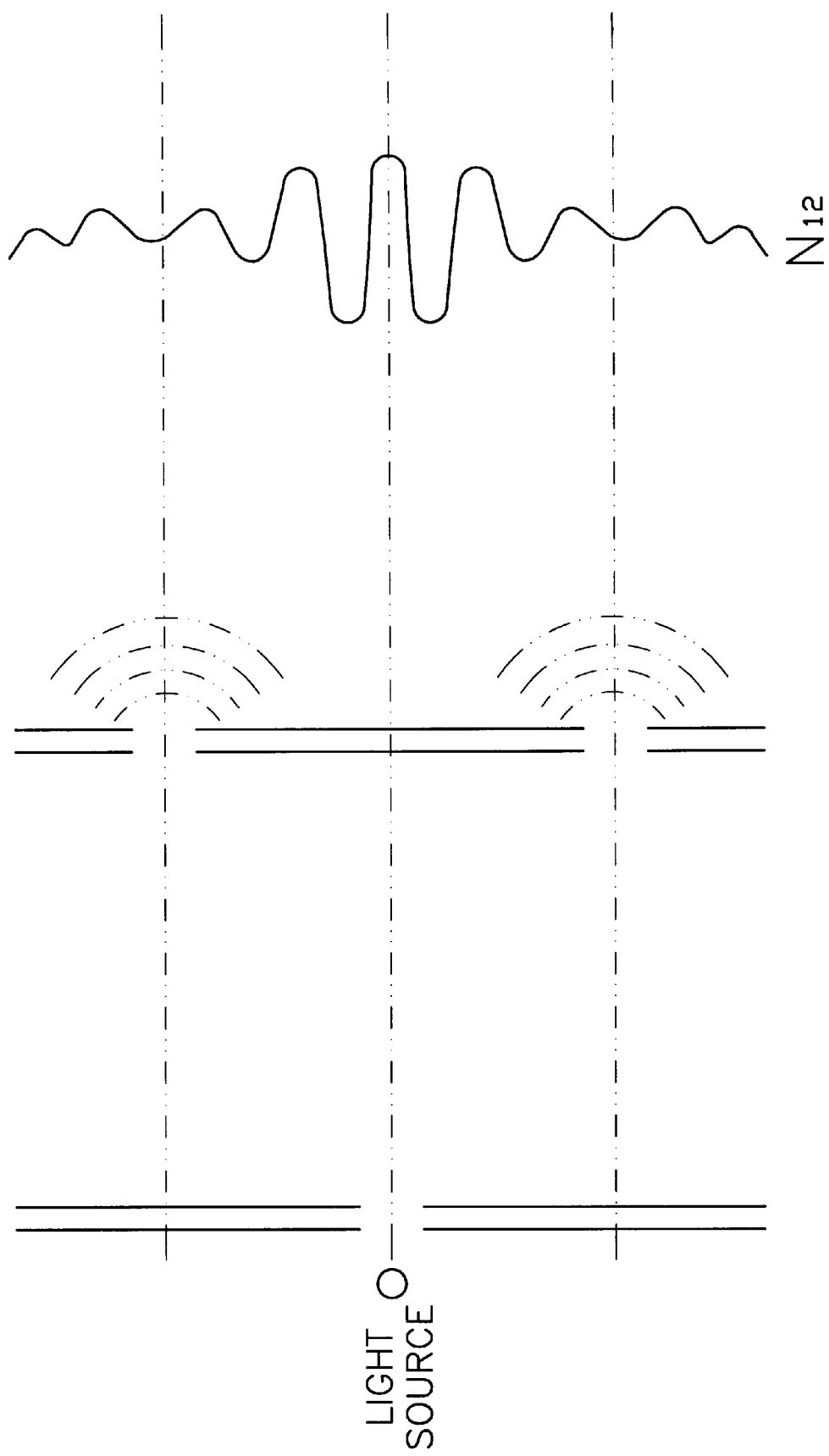

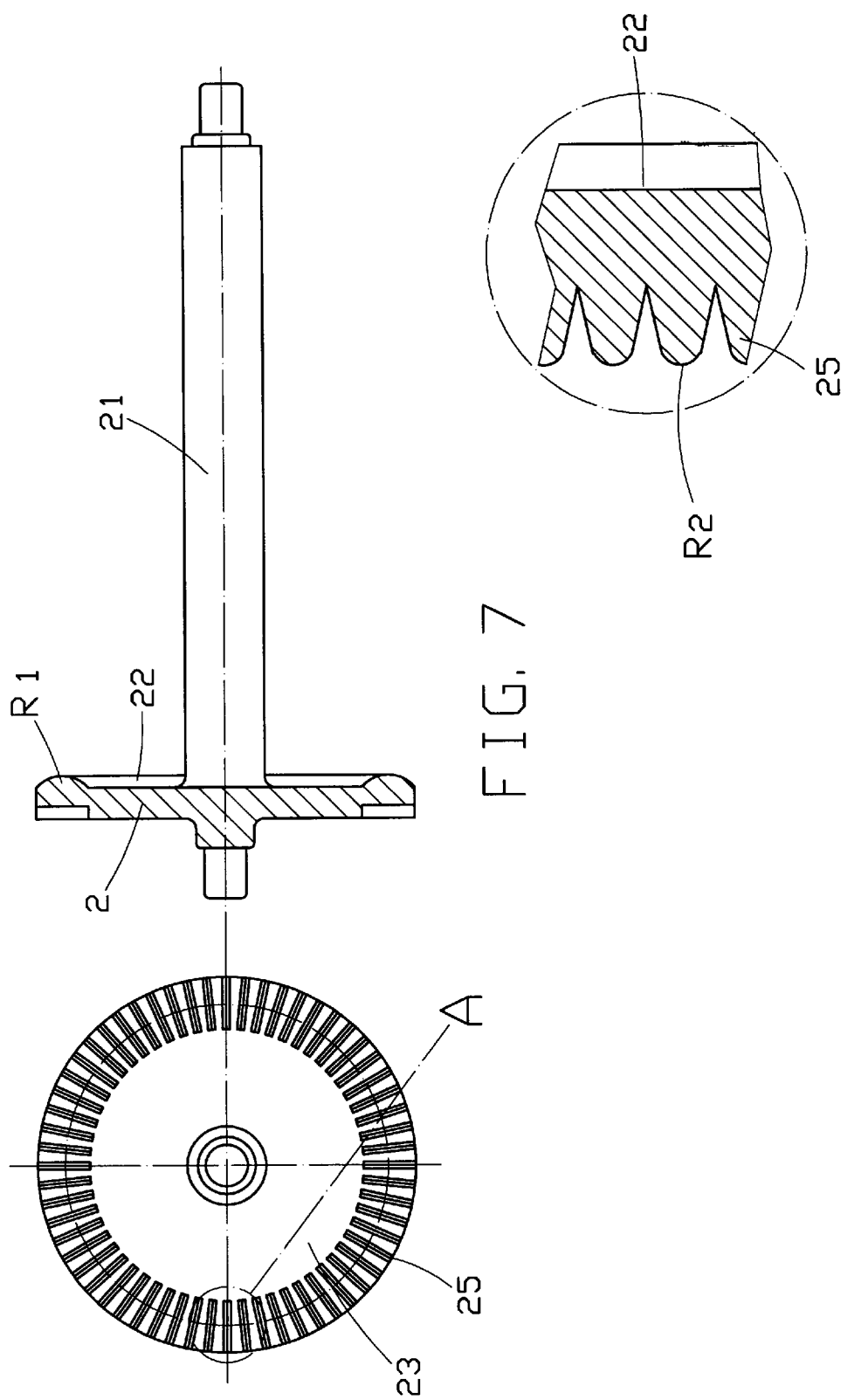

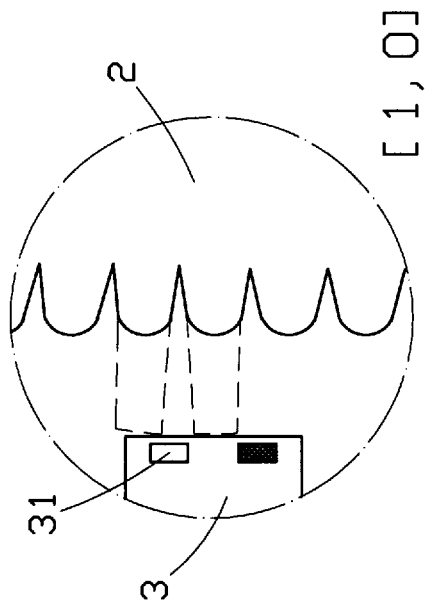
FIG.8A [1, 1]
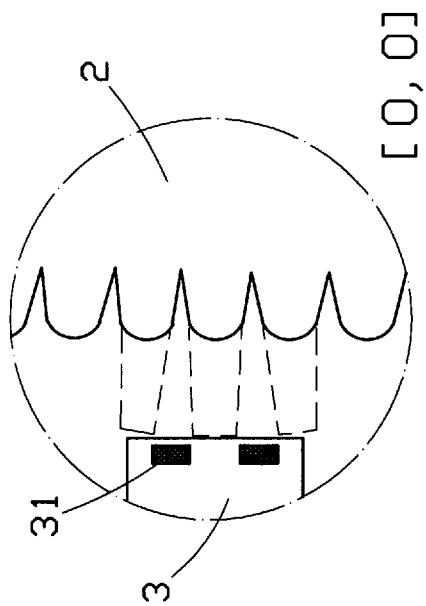
FIG.8B [1, 0]
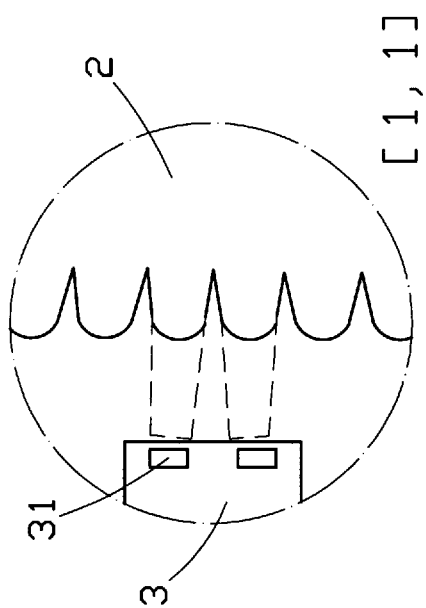
FIG.8D [0, 1]
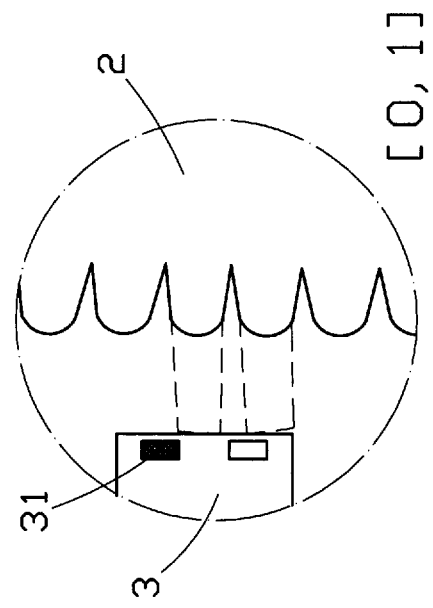
FIG.8C [0, 0]

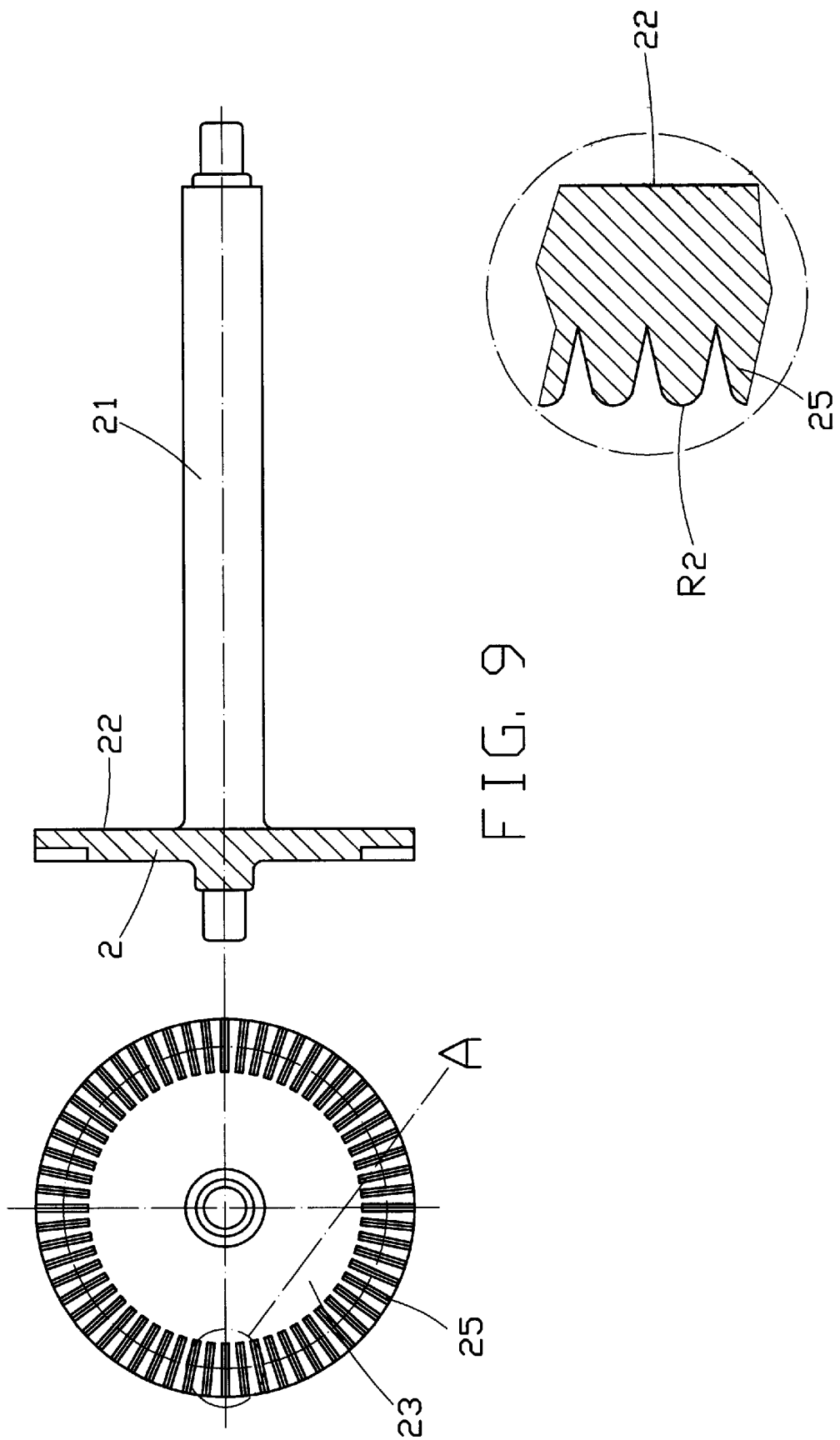

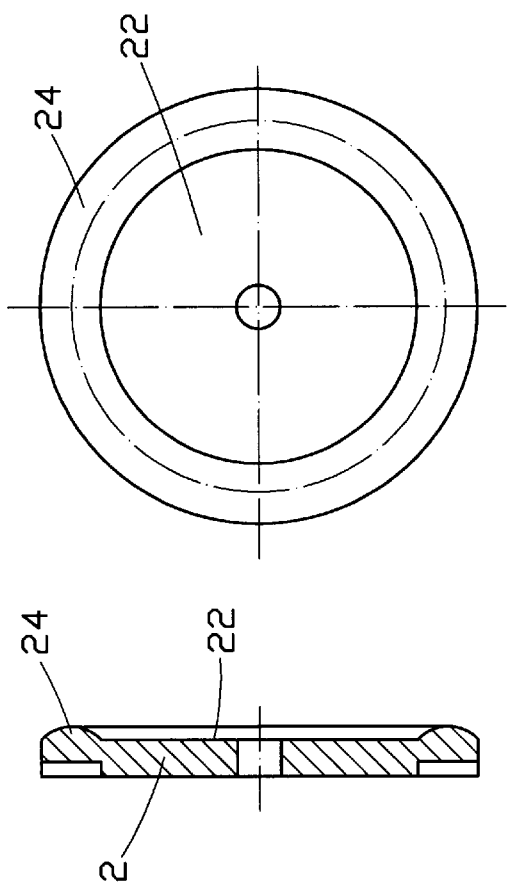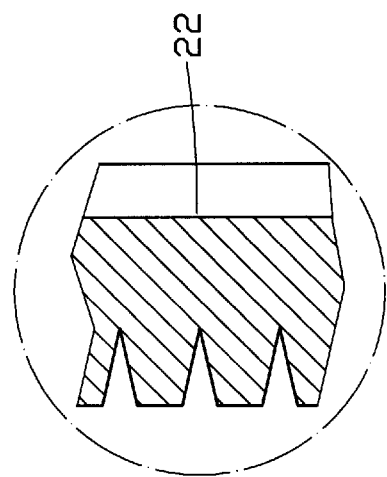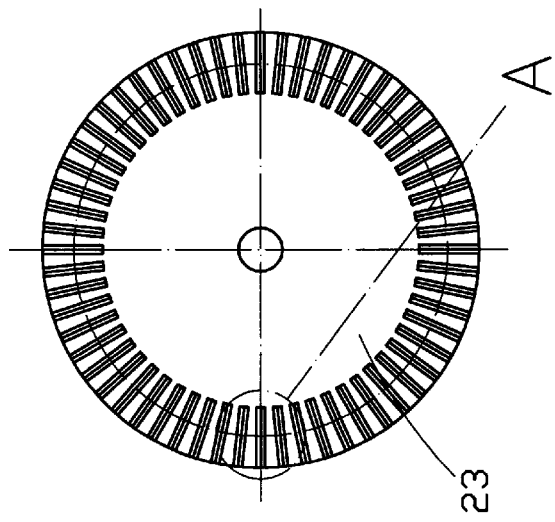
FIG. 10
FIG. 10A

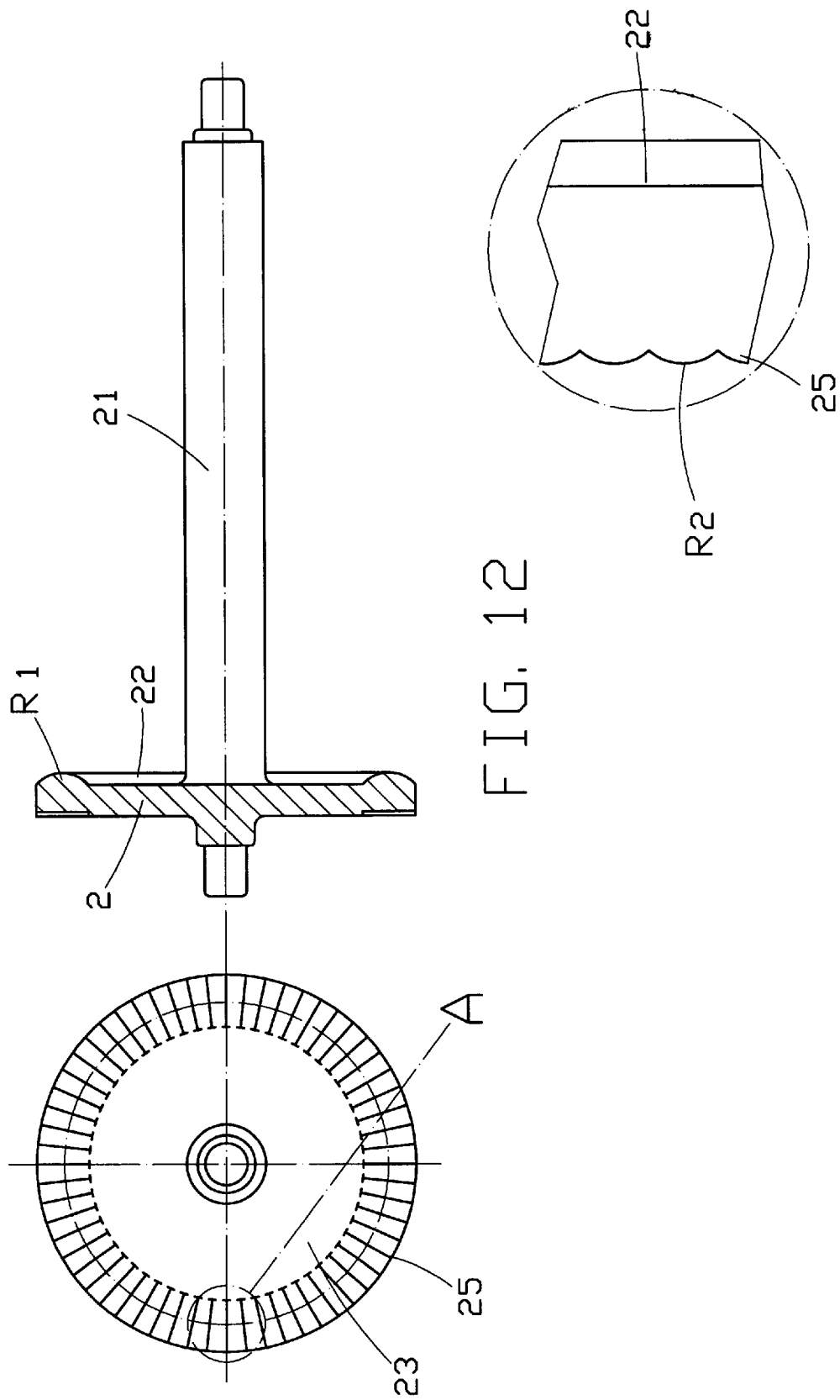

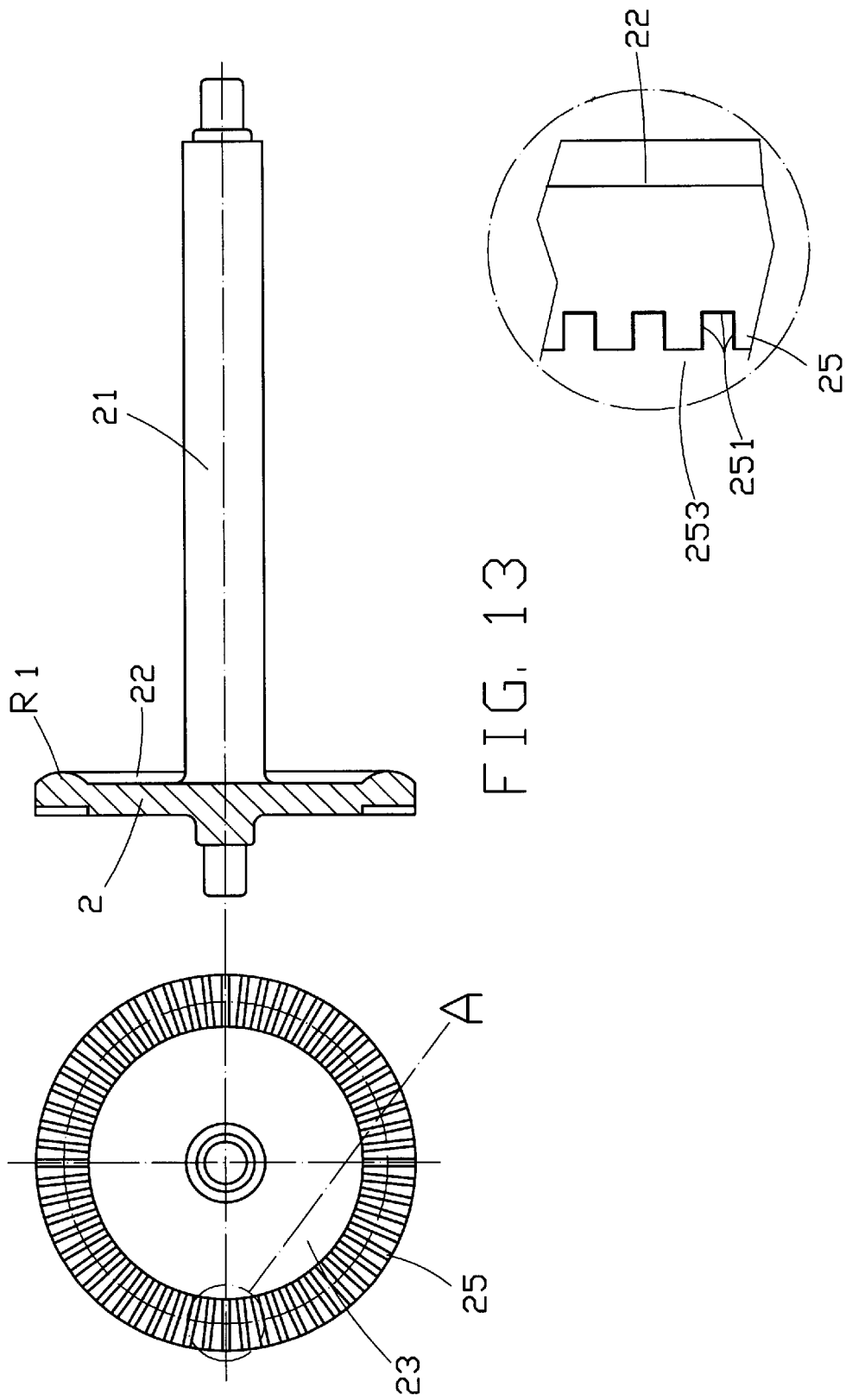

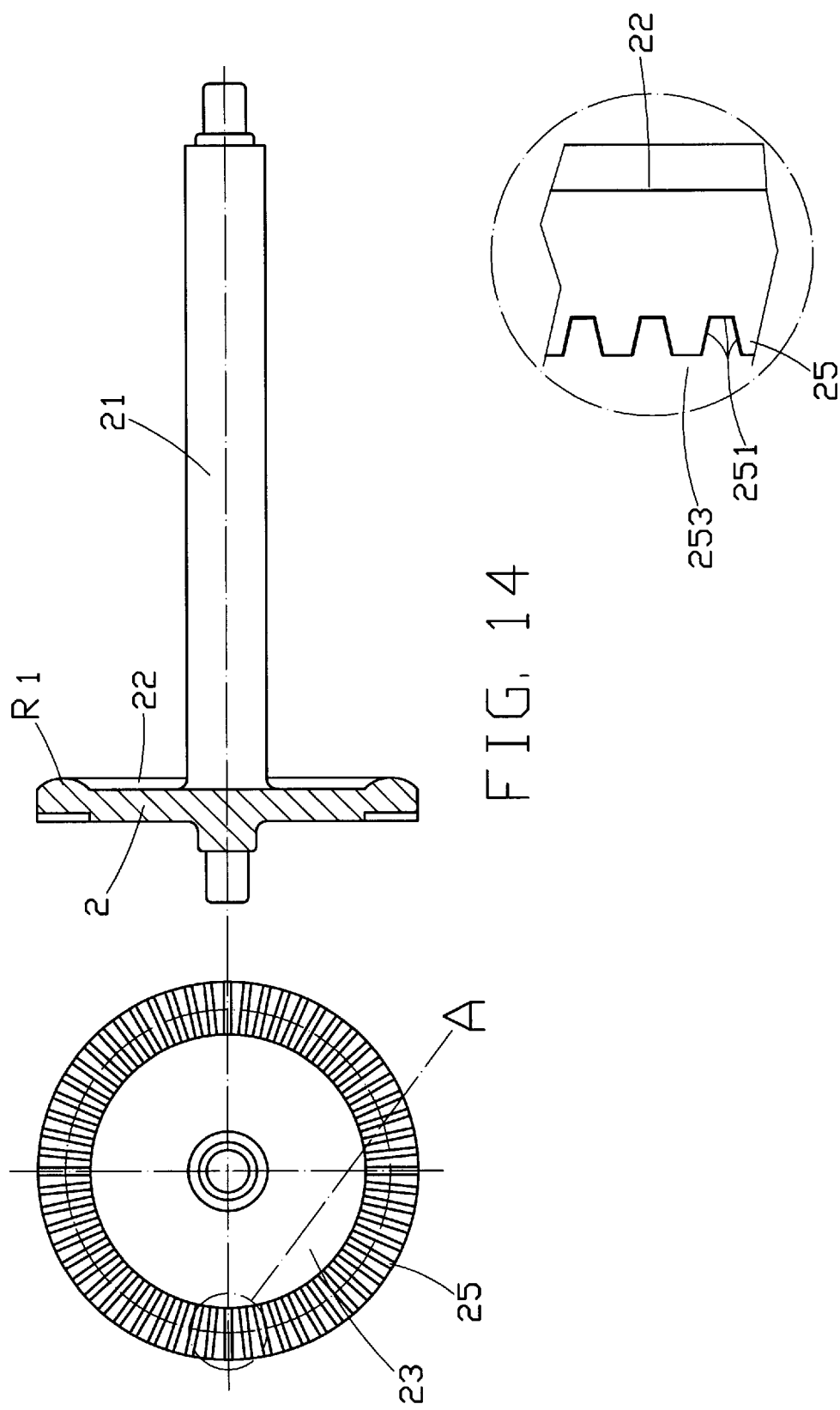

PHOTO-DETECTOR BASED CALCULATING MEANS HAVING A GRATING WHEEL WITH INTEGRATED LENSES

FIELD OF THE INVENTION

The present invention relates to a focusing-type calculating means, more particularly, to an encoder which can prevent constructive and destructive interference when light is emitted toward a photo-detector through a grating wheel.

BACKGROUND OF THE INVENTION

The conventional optical encoder, shown in FIG. 1, is a blocking-type encoder. The encoder comprises a grating wheel 60, a light source 70, and a photo-detector 80. The light source 70 is arranged near the grating wheel 60 so as to emit light toward the grating wheel 60. The grating wheel 60 is centered on an axis 50 and is rotated by a driving means (not shown). The grating wheel 60 is provided with a plurality of slits 61 along the distal portion thereof. Moreover, there is an opaque section 62 arranged between two adjacent slits 61. The photo-detector 80 is placed at the proximity of the grating wheel 60 and comprises a photo-sensitive chip 81 to receive the light emitted from the slit 60.

The light emitted from light source 70 is chopped by slit 61 and opaque section 62 of grating wheel 60, and becomes a working beam when grating wheel 60 is rotated. The working beam is detected by photo-detector 80 and is converted to a sinusoidal signal on an oscilloscope. The signal is processed by a rectifier to form four signals (0,0), (0,1), (1,1), (1,0).

However, due to the wave nature of light, light emitted from two slits may interfere with each other, as shown in FIG. 2. This interference may cause a malfunction in photo-detector 80.

To eliminate the interference caused by the two adjacent slits, one may bring the photo-sensitive chip 81 of photo-detector 80 near slit 61. Another approach is to make the area of slit 61 larger than that of the photo-sensitive chip 81 (an increase of at least a third). However, the first approach makes fabrication complicated and difficult, while the second approach degrades resolution.

As shown in FIG. 3A, D represents the light source, C is the grating, A and B are the two slits, and S is the photo-detector, which moves along direction T. FIG. 3B shows the distribution of light intensity, where $N_1$ and $N_2$ represent average intensity distributions and H represents probability. As shown in FIG. 3B, $N_1=(H_1)^2$ is the average intensity distribution detected by photo-detector S, when slit B is blocked. Moreover, $N_2=(H_2)^2$ is the average intensity distributions detected by photo-detector S when slit A is blocked.

If the light passing through slits A and B does not interfere, the light intensity distribution detected by photo-detector S will be $N_{12}=N_1+N_2$, as shown in FIG. 3C.

However, according to the principles of wave optics, the light intensity distribution detected by photo-detector S is that shown in FIG. 4, due to the interference between two slits. To eliminate this interference, one may route the light by a path which does not pass through the slits. Another method is to focus the light before it reaches the photo-detector. As shown in FIG. 5, the photo-detector can be placed between the lens and the focal point of the lens to eliminate the interference phenomenon.

SUMMARY OF THE INVENTION

The object of the present invention is to provide a focusing-type calculating means having a ring-shaped lens which is arranged on the input plane of a grating wheel in order to focus the light emitted from the light source. Further, a plurality of tooth-shaped lenses are provided, each being perpendicular to the ring-shaped lens and are arranged on the output plane of the grating wheel to focus the working beam after the working beam has passed through the output plane, thus minimizing the interference.

Another object of the present invention is to provide a focusing-type calculating means in which the photo-sensitive chip can be positioned farther from the output plane of the grating wheel without increasing fabrication complexity or reducing resolution.

The various objects and advantages of the present invention will be more readily understood from the following detailed description when read in conjunction with the three appended Drawings, in which:

BRIEF DESCRIPTION OF THE DRAWINGS

FIG. 3A shows a two-slit interference set-up;

FIG. 4 is a realistic plot of the light intensity distribution measured by the set-up of FIG. 3A when both slits are open;

FIG. 7 shows the front view and side view of the present invention;

FIG. 8 shows the four signals (0,0), (0,1), (1,1), (1,0) appearing on oscilloscope when the wheel of the present invention rotates;

FIG. 9 shows the front view and side view of another embodiment of the present invention;

FIG. 10 shows the front view and both side views of a third embodiment of the present invention;

FIG. 12 is a schematic diagram showing the tooth-shaped lens replaced by a convex tooth-shaped lens;

FIG. 13 is a schematic diagram showing the tooth-shaped lens replaced by a strip-shaped lens; and, FIG. 14 is a schematic diagram showing the tooth-shaped lens replaced by a tapered lens.

DETAILED DESCRIPTION OF THE PREFERRED EMBODIMENT

Figure 6:
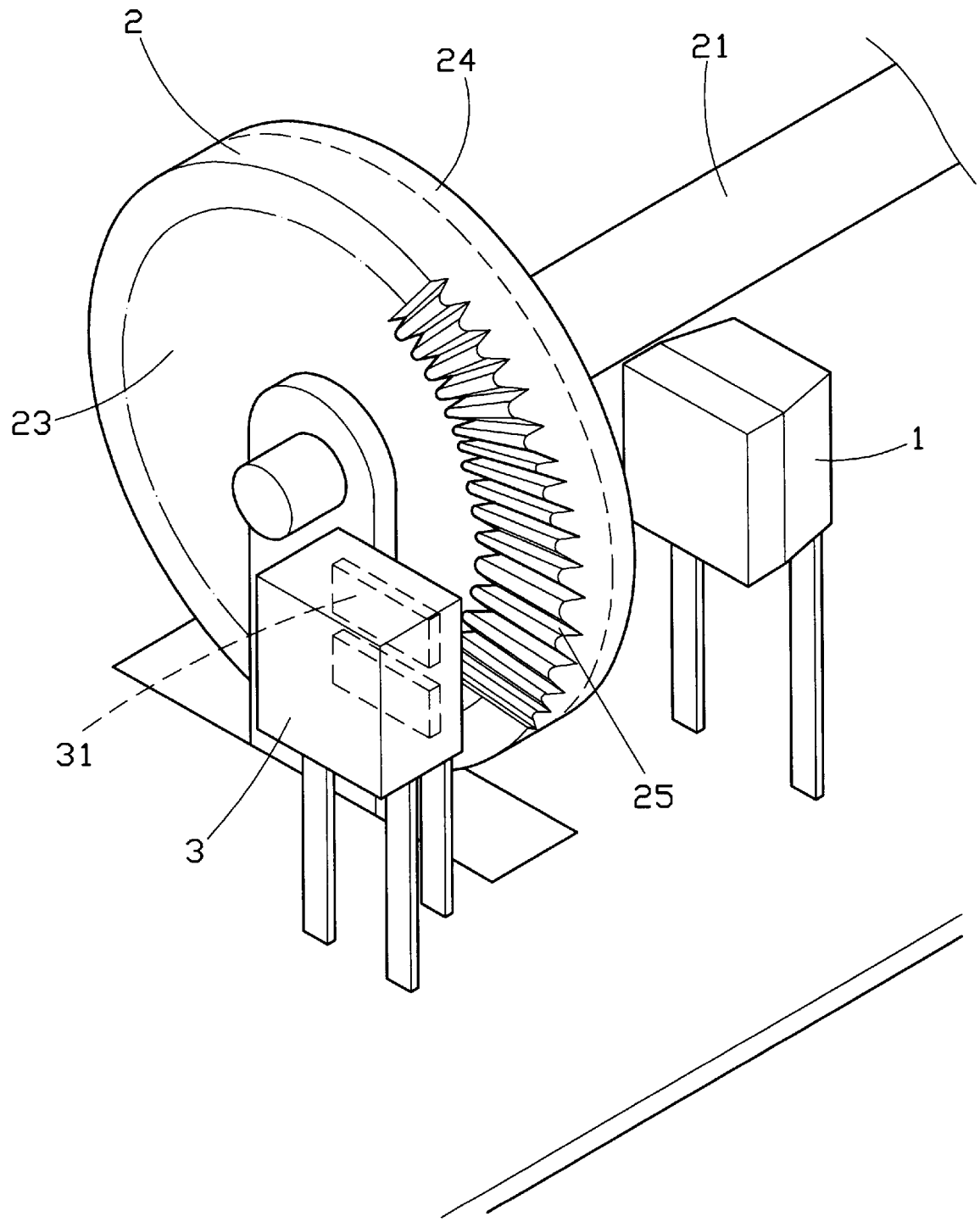
FIG. 6 shows a schematic diagram of the present invention.

As shown in FIGS. 6 and 7, the focusing-type calculating means according to the present invention comprises a light source 1, a grating wheel 2, and a photo-detector 3. The light source 1 is arranged in proximity to the grating wheel 2, thus light emitted from the light source 1 will impinge upon the input plane 22 of grating wheel 2.

The grating wheel 2 is rotatably arranged on an axis 21, through the center thereof, and is rotated by a driving means (not shown). A ring-shaped lens 24, with radius of curvature R1, is arranged on the input plane 22 of grating wheel 2 to focus the light emitted from the light source 1. A plurality of tooth-shaped lenses 25, each with radius of curvature R2, are arranged on the output plane 23 of grating wheel 2. The tooth-shaped lenses 25 have a total internal reflection angle smaller than 41.8° and are positioned perpendicular to the ring-shaped lens 24. According to the lens formula $1/f=(1/R1+1/R2)(m-1)$, the focal length f is dependent upon R1 and R2.

The photo-detector 3 is made of transparent material and positioned between tooth-shaped lenses 25 and the focal point of the tooth-shaped lenses 25, and further positioned opposite of light source 1. The photo-detector 3 comprises upper and lower photo-sensitive chips 31 in order to receive the working beam emitted from the output plane 23.

When the working beam impinges upon the input plane 22 of the wheel 2, the ring-shaped lens 24 will focus the beam. After the working beam passes through the output plane 23, the tooth-shaped lenses 25 refocus the beam. Thus, the problem of interference is minimized when the working beam reaches the photo-sensitive chips 31 of the photo-detector 3.

Figure 1:
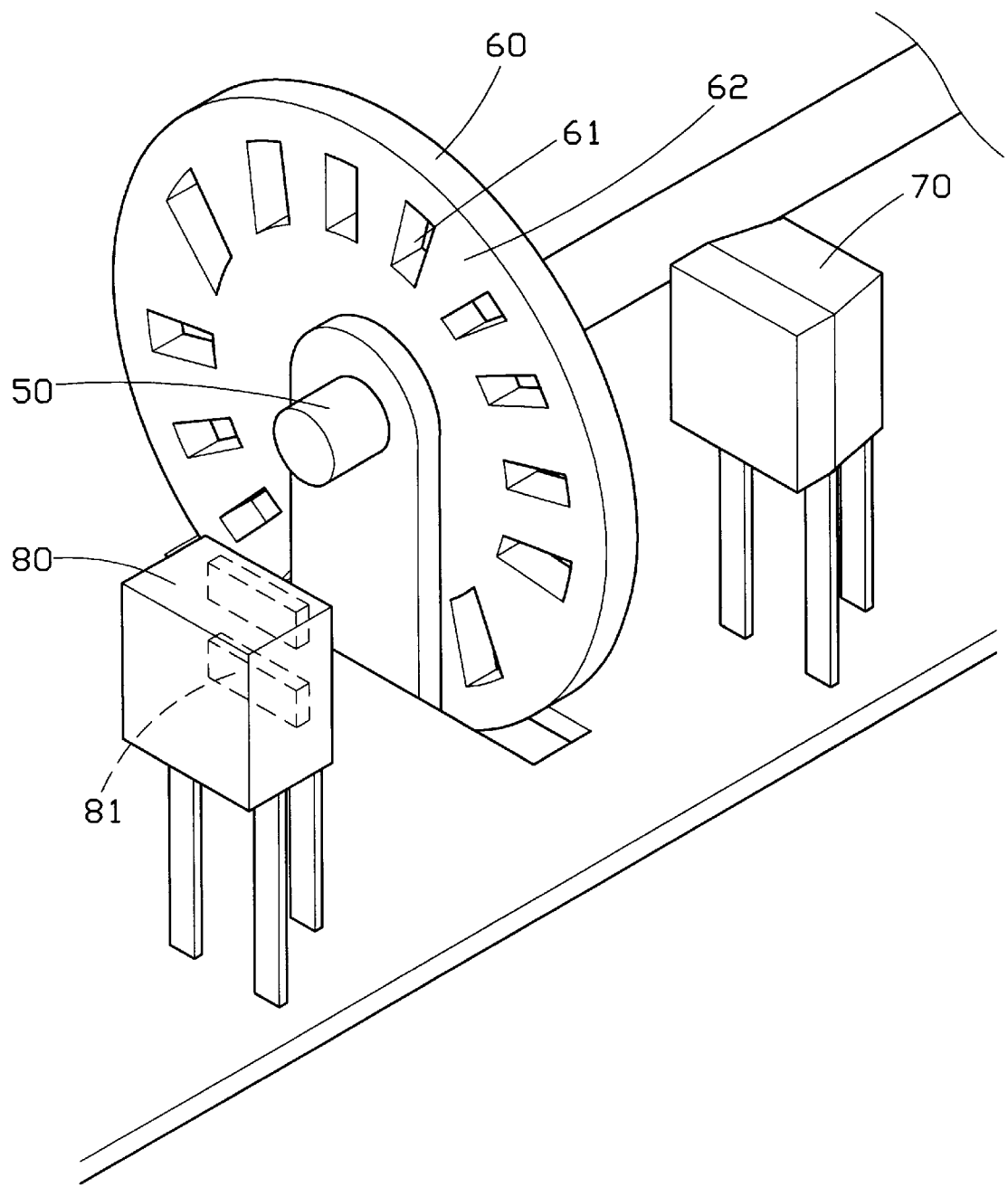
FIG. 1 shows a conventional blocking-type photo encoder.
Figure 2:
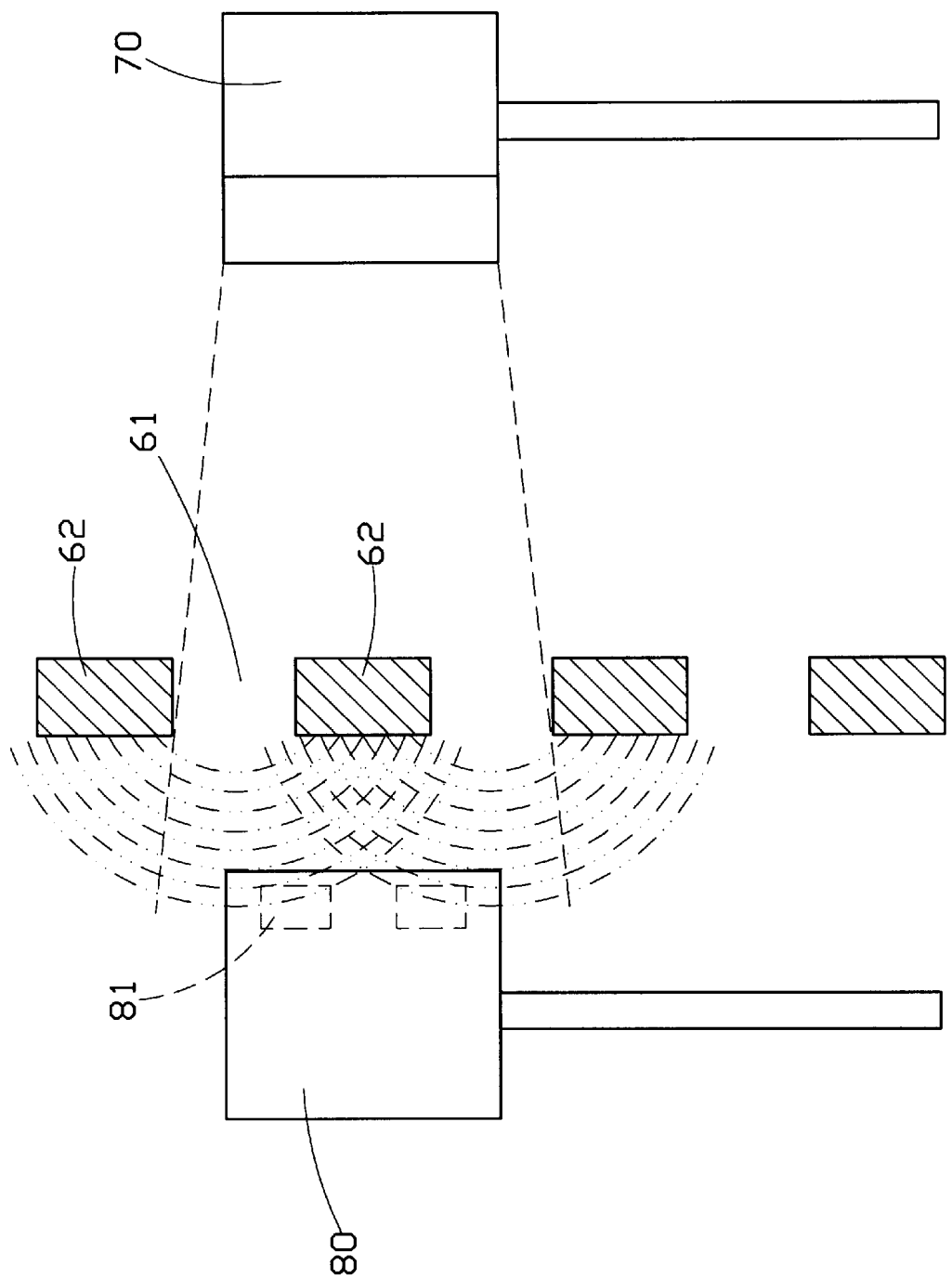
FIG. 2 shows the light intensity distribution caused by two-slit interference.
Figure 3B:
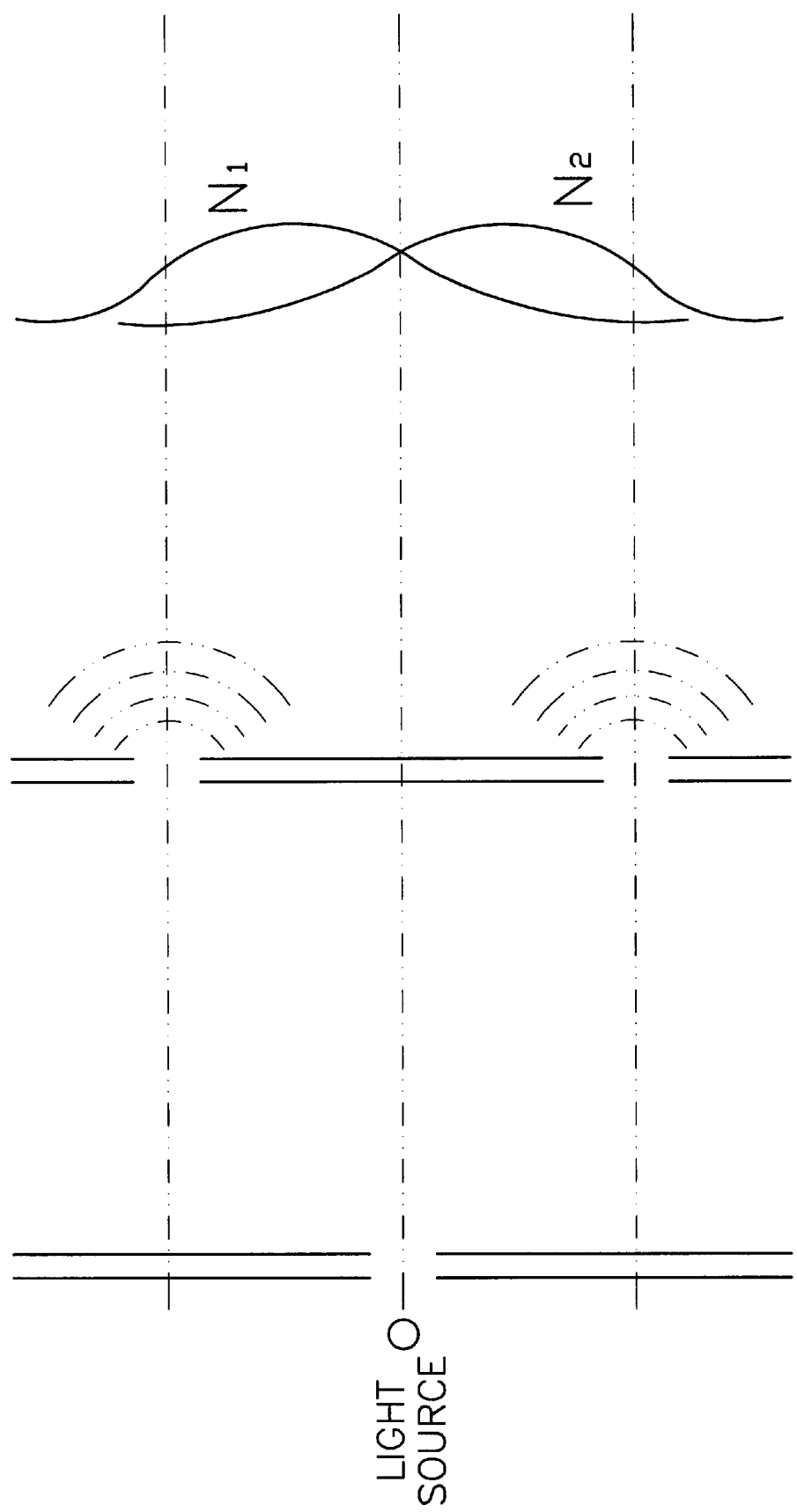
FIG. 3B shows the light intensity distribution measured by the set-up of FIG. 3A.
Figure 3C:
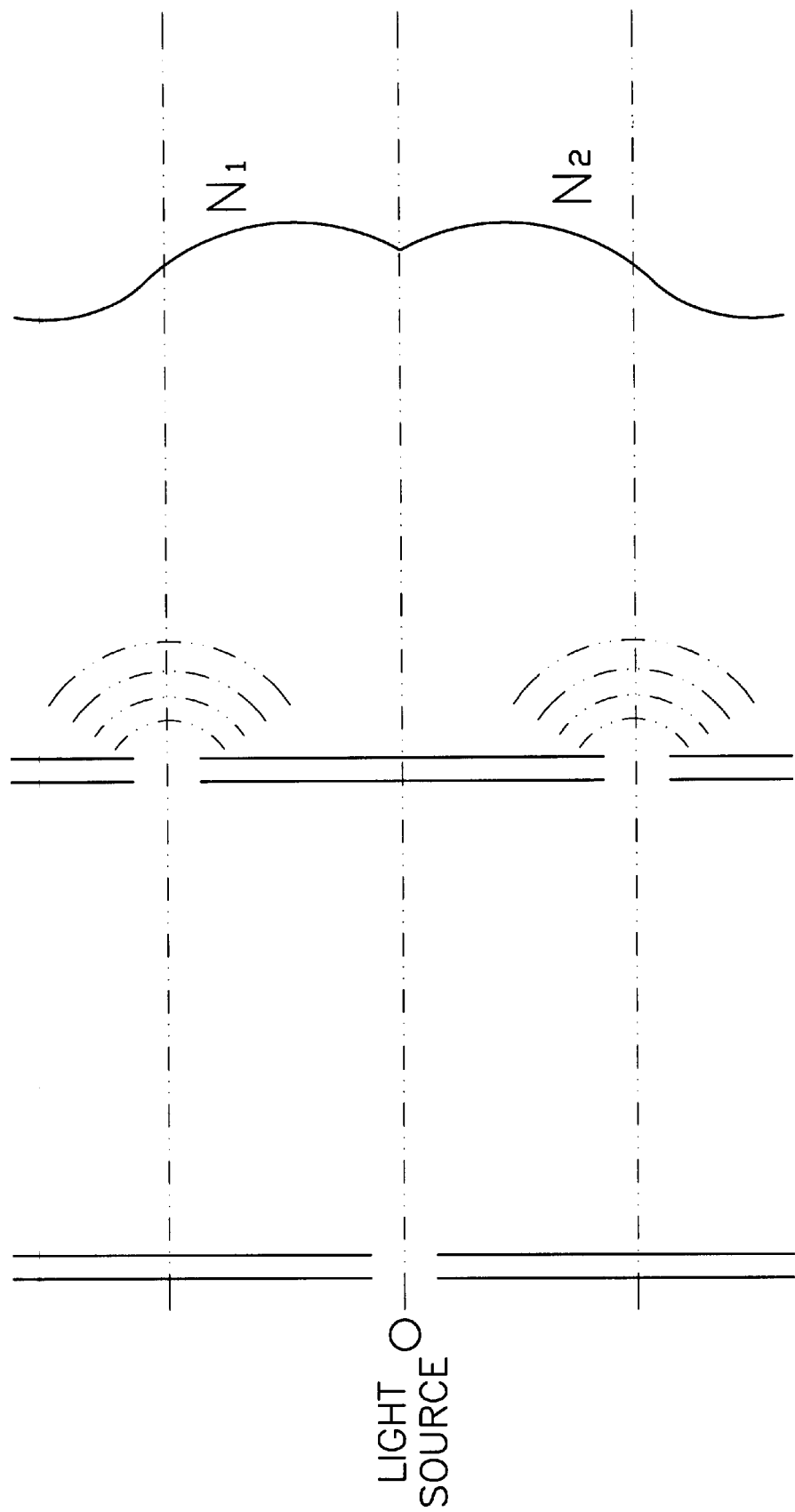
FIG. 3C is a non-realistic plot of the light intensity distribution measured by the set-up of FIG. 3A when both slits are open.
Figure 5:
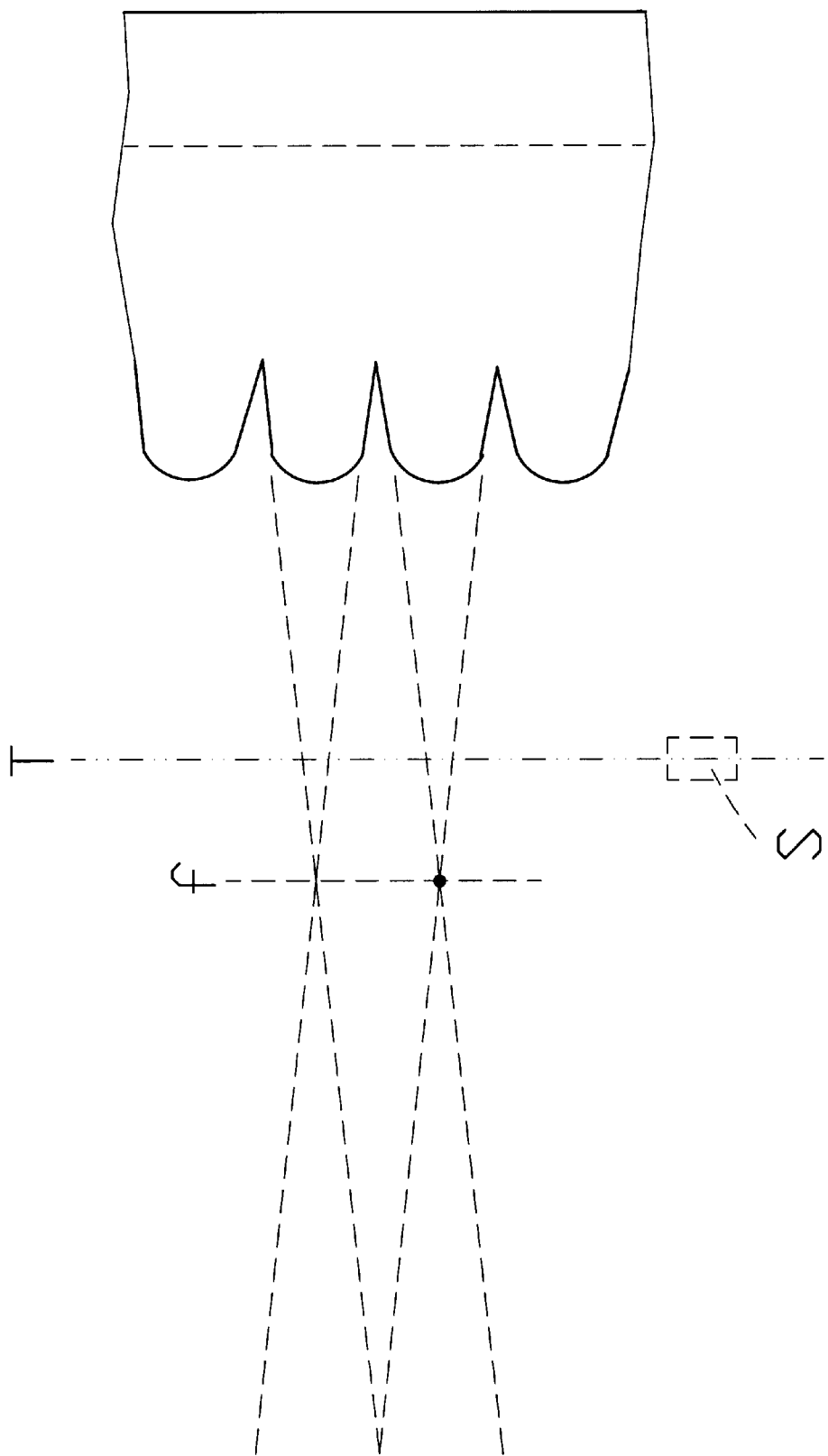
FIG. 5 shows the focusing of the working beam according to the present invention.

When the grating wheel 2 rotates, light emitted from the light source 1 is chopped by grating wheel 2 and forms a working beam. The working beam is detected by the photo-detector 3 and is subsequently converted to a sinusoidal signal on an oscilloscope. The signal is processed by a rectifier to form the four signals (0,0), (0,1), (1,1), (1,0), as shown in FIG. 1.

As shown in FIG. 9, the input plane 22 can be a planar shape and focusing is achieved by the tooth-shaped lenses 25.

As shown in FIG. 10, the output plane 25 can be provided with a plurality of tooth-shaped surfaces, the light emitted from the light source 1 being focused by ring-shaped lens 24.

Figures 11, 11A:
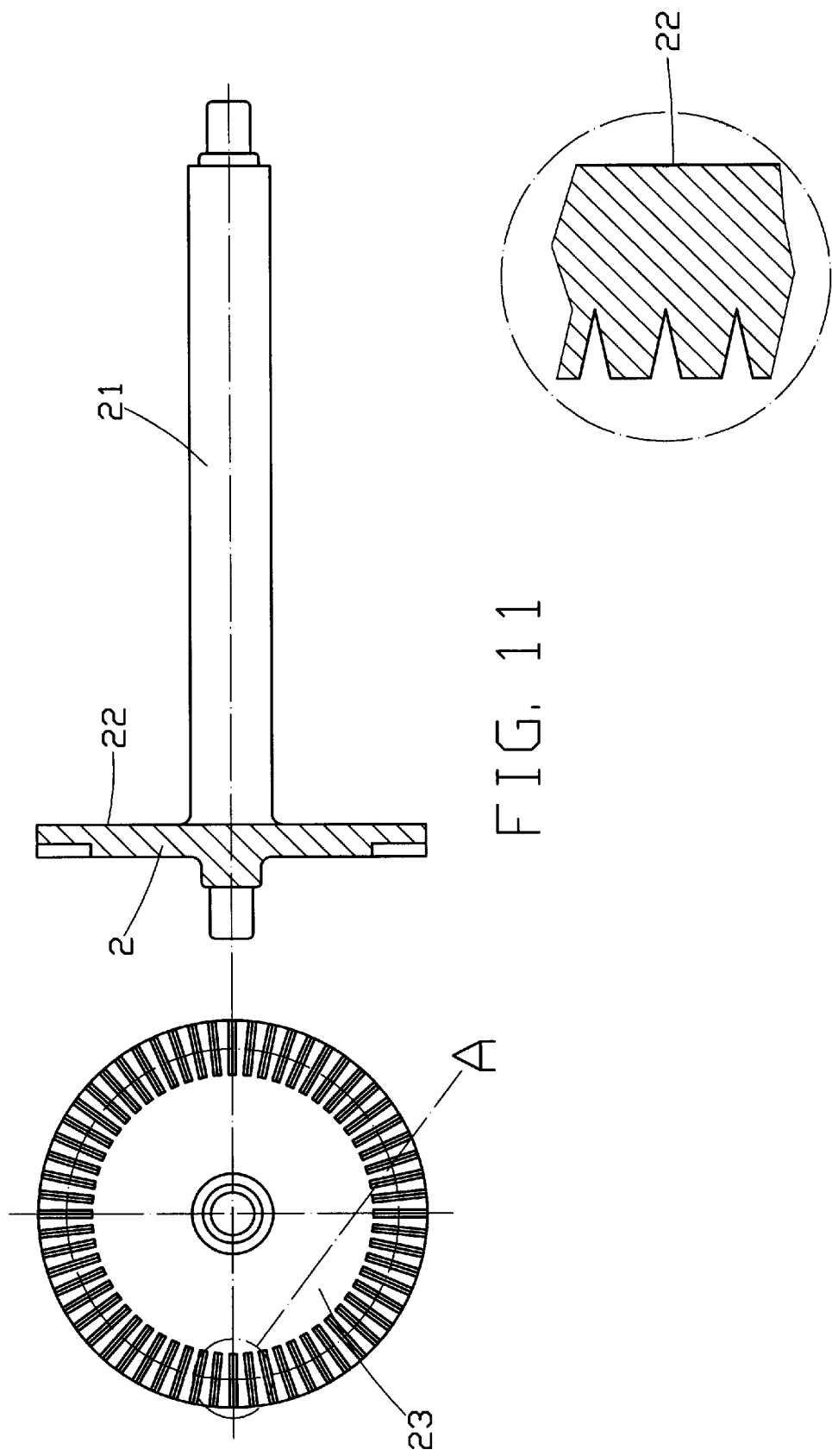
FIG. 11 shows the front view and side view of a fourth embodiment of the present invention.

As shown in FIG. 11, the input plane can be a planar shape, and the output plane 25 can be provided with a plurality of tooth-shaped surfaces.

As shown in FIGS. 12–14, the tooth-shaped lenses 25 can be replaced by a set of convex tooth-shaped lenses, as shown in FIG. 12, strip-shaped lenses as shown in FIG. 13, or a set of tapered lenses, as shown in FIG. 14, in order to focus the working beam after the working beam passes through the output plane, thus minimizing the interference.

The convex portion 253 or concave portion 251 of the strip-shaped lens or the tapered lens can be coated with a reflective medium, an opaque medium, or can be ground to form ground glass in order to reflect unwanted or interfering external light when the working beam is in operation.

In summary, the present invention minimizes the interference when the working beam reaches the photo-sensitive chip of the photo-detector due to the focusing of the beam.

Although the present has been described with reference to the two preferred embodiments thereof, it will be understood that the invention is not limited to the details thereof. Various substitutions and modifications have been suggested in the above description, and others may be obvious to those skilled in the art. All such substitutions and modifications are intended to be encompassed within the scope of the invention as defined in the Claims.

What is claimed is:

1. A photo-detector based calculating means having a grating wheel with integrated lenses comprises a light source, a grating wheel, and a photo-detector, said grating wheel receiving light emitted from said light source, said photo-detector comprising a set of photo-sensitive chips to receive working beams of light emitted from said grating wheel, said photo-detector based calculating means having a grating wheel with integrated lenses being characterized in that:

an input plane of said grating wheel has a ring-shaped lens to focus said light emitted from said light source and an output plane of said grating wheel has a plurality of tooth-shaped lenses, each of said lenses being disposed perpendicularly to said ring-shaped lens which can focus said working beam after said working beam passes through said output plane, thus minimizing interference.

2. The photo-detector based calculating means having a grating wheel with integrated lenses as recited in claim 1, wherein said photo-detector is positioned between said tooth-shaped lenses and the focal point of said tooth-shaped lenses.

3. The photo-detector based calculating means having a grating wheel with integrated lenses as recited in claim 1, wherein a total internal reflection angle of said tooth-shaped lenses is smaller than 41.8 degrees.

4. The photo-detector based calculating means having a grating wheel with integrated lenses as recited in claim 1, wherein said input plane of said grating wheel is of planar shape.

5. The photo-detector based calculating means having a grating wheel with integrated lenses as recited in claim 1, wherein said output plane of said grating wheel is provided with a plurality of tooth-shaped surfaces.

6. The photo-detector based calculating means having a grating wheel with integrated lenses as recited in claim 1, wherein said input plane of said grating wheel is of planar shape, and said output plane of said grating wheel is provided with a plurality of tooth-shaped surfaces.

7. A photo-detector based calculating means having a grating wheel with integrated lenses comprises a light source, a grating wheel, and a photo-detector, said grating wheel receiving light emitted from said light source, said photo-detector comprising a set of photo-sensitive chips to receive working beams of light emitted from said grating wheel, said photo-detector based calculating means having a grating wheel with integrated lenses being characterized in that:

an input plane of said grating wheel has a ring-shaped lens to focus said light emitted from said light source and an output plane of said grating wheel has a plurality of convex tooth-shaped lenses, each of said lenses being disposed perpendicularly to said ring-shaped lens which can focus said working beam after said working beam passes through said output plane, thus minimizing interference.

8. A photo-detector based calculating means having a grating wheel with integrated lenses comprises a light source, a grating wheel, and a photo-detector, said grating wheel receiving light emitted from said light source, said photo-detector comprising a set of photo-sensitive chips to receive working beams of light emitted from said grating wheel, said photo-detector based calculating means having a grating wheel with integrated lenses being characterized in that:

an input plane of said grating wheel has a ring-shaped lens to focus said light emitted from said light source and an output plane of said grating wheel has a plurality of strip-shaped lenses, each of said lenses being disposed perpendicularly to said ring-shaped lens which can focus said working beam after said working beam passes through said output plane, thus minimizing interference.

9. The photo-detector based calculating means having a grating wheel with integrated lenses as recited in claim 8, wherein part of a convex portion or a concave portion of said strip-shaped lenses can be coated with a photo-reflective medium, an opaque medium, or said strip-shaped lenses may be ground to form a ground glass surface in order to reflect interfering external light when the working beam is in operation.

10. A photo-detector based calculating means having a grating wheel with integrated lenses comprises a light source, a grating wheel, and a photo-detector, said grating wheel receiving light emitted from said light source, said photo-detector comprising a set of photo-sensitive chips to receive working beams of light emitted from said grating wheel, the photo-detector based calculating means having a grating wheel with integrated lenses being characterized in that:

an input plane of said grating wheel has a ring-shaped lens to focus said light emitted from said light source and an output plane of said grating wheel has a plurality of tapered lenses, each of said lenses being disposed perpendicularly to said ring-shaped lens which can focus said working beam after said working beam passes through said output plane, thus minimizing interference.

11. The photo-detector based calculating means having a grating wheel with integrated lenses as recited in claim 10, wherein part of a convex portion or a concave portion of said tapered lenses can be coated with a photo-reflective medium, an opaque medium, or said tapered lenses may be ground to form a ground glass surface in order to reflect interfering external light when the working beam is in operation.

* * * * *